Patented Apr. 19, 1938

2,114,812

UNITED STATES PATENT OFFICE 2,114,812

COMPOSITION OF MATTER AND PETROLEUM PRODUCTS AND METHOD OF MAKING SAME

Orland M. Reiff and Darwin E. Badertscher, Woodbury, N. J., assignors to Socony-Vacuum Oil Company, Incorporated, New York, N. Y., a corporation of New York No Drawing. Application June 9, 1936, Serial No. 84,294

8 Claims. (Cl. 87—9)

This invention has to do with pour point depressants, that is, with substances which, when added to a substantially homogeneous mixture of oil and wax, have the power of lowering the temperature at which that mixture congeals or ceases to flow. Lubricant oils of petroleum origin usually contain wax. Those of most desirable characteristics from other standpoints contain considerable wax and without its removal, frequently congeal at temperatures in the neighborhood of 50–60° F. In order to produce oils capable of flowing and lubricating under normal atmospheric conditions, the oils must have lower congealing temperatures. Wax is conveniently removed to secure moderately low pour points of the order of 20–30° F. by chilling the oil, usually in the presence of a diluent, until the wax crystallizes, and then filtering out the wax. With greater chilling, the pour point may even be reduced by this method to —5° F. or —10° F., but not only does the refrigerating cost become increasingly great for pour points below about 20° F., but considerable valuable oil is lost, and, of most importance, rigorous dewaxing is found to impair the quality of the oil. But pour points of —5° F., —10° F., and —20° F. are imperative for oils used for winter use in automobiles in cold climates, and are advisable even in warmer climates. Present practice produces such oils by dewaxing in the usual manner to about 20° F., and then adding to the oil some compound which will further reduce the congealing temperature to the desired level. Such additive compounds are termed pour point depressants.

Soaps, oxidation products of petroleum, and other similar compounds have been hitherto used as depressants. A depressant now in use is prepared by condensing together naphthalene and petroleum wax. More recently, condensation products of phenolic compounds and wax have been proposed, and it has been proposed to modify members of these classes by partial resinification. Another recent proposal is the use of products resulting from the condensation of various organic ethers, such as aryl-aryl ethers, and mixed alkyl-aryl ethers with petroleum wax. This invention is particularly directed to the improvement of depressants of these latter types.

This invention is based upon the discovery that pour point depressants produced by condensing aryl-aryl, alkyl-aryl, aralkyl-aryl, and aralkyl ethers with chlorinated petroleum wax, in the presence of a catalyst such as aluminum chloride, may be further improved in many important respects by reacting them with an acylating agent, such as the chloride or anhydride of an organic acid, such as for example, phthalyl chloride, phthalic anhydride, succinyl chloride and anhydride, stearoyl chloride, benzoyl chloride, and the like.

Definition of the field with which this present invention is concerned may be made best by first defining the classes of starting compounds which may be employed therewith. The mixed alkylaryl or aralkyl-aryl ethers which may be used in accordance with this invention are those having the general formula 1. 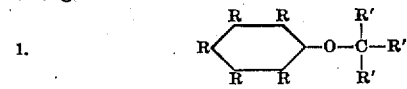

wherein R may be a radical selected from the group consisting of hydrogen, alkyl, aryl, aralkyl, alkaryl, alkoxy or aroxy radicals, or combinations thereof, exclusive of hydroxy, but wherein a sufficient number of R's are hydrogen to permit of condensation with a sufficiently great proportion of wax to give depressants of proper characteristics. Preferably at least three or four R's should be hydrogen, the remainder preferably being not more complex than simple alkyl or aryl combinations. In the alkyl radical or aralkyl radical of the ether group or linkage shown above the R's may be hydrogen, alkyl, or aryl radicals. We may also use as the starting material compounds of the general formulas 2. 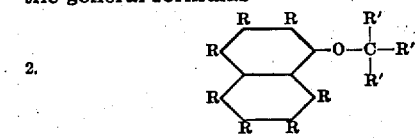

or

3. 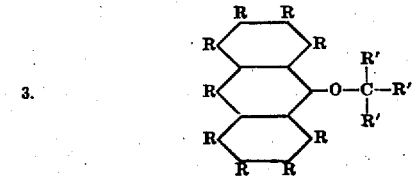

wherein R and R' have the same significance as above noted, and wherein any position of oxygen-to-aromatic nucleus is permissible. Specific examples of the foregoing starting materials (mixed aromatic-aliphatic ethers) are alpha and beta naphthyl methyl ether, and benzyl alpha and beta naphthyl ethers.

Similarly this invention may be applied to starting compounds derived from ethers having the general formula 4. 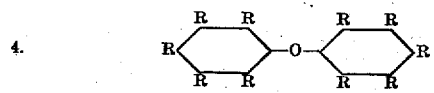

where R as before signifies a radical selected from the group consisting of hydrogen, alkyl, aryl, aralkyl, alkaryl, alkoxy or aroxy radicals or combinations thereof, subject again to the restriction that a sufficient number of R's be hydrogen to permit of sufficient wax substitution to give suitable depressants. Preferably at least three or four R's should be hydrogen, the remainder preferably being simple, alkyl, or hydrogen. It is understood that Formula 4 signifies as well those aryl-aryl ethers wherein one or both radicals of the ether may be naphthyl or anthranyl or their derivatives. Examples of these types of compounds are phenyl ether, naphthyl ether, phenyl naphthyl ethers, and tolyl phenyl ethers.

This invention may also be applied to compounds derived from aralkyl ethers having the general formula 5. 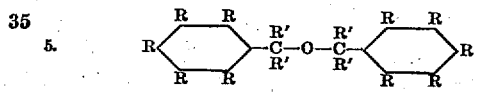

where R signifies a radical selected from the group consisting of hydrogen, alkyl, aryl, aralkyl, alkaryl, alkoxy, or aroxy radicals or combinations thereof, subject also to the restriction that a sufficient number of R's be hydrogen to permit of condensation with a sufficiently great proportion of wax to give suitable depressants. The R's may be hydrogen, alkyl or aryl radicals. It is understood that Formula 5 signifies as well the aralkyl ethers wherein one or both radicals may be a naphthyl or anthranyl derivative. Dibenzyl ether is the best example of this type of compound found useful in this invention.

Within the broad group thus outlined, the ether compounds at present preferred are anisole, naphthyl methyl ethers, and phenyl ether.

The first reaction of this synthesis upon the above-defined starting materials is the substitution of alkyl compounds of high molecular weight in the aryl constituent preferably by means of a Friedel-Crafts reaction in the presence of aluminum chloride. The alkyl compounds useful for this purpose are the high boiling fractions of petroleum of waxy nature and like compounds of other origin. Of these, the compounds of lower molecular weight give products of limited value and therefore it is preferred to use crystalline petroleum wax of at least 120° F. melting point, corresponding to a molecular weight of 250 and upwards. Use of relatively short alkyls, as for instance those present in heavy lubricating oil, petrolatum, wax distillate, and the like while possible, is to be generally not preferred. For use in the synthesis, the wax is first chlorinated, as by heating to about 200° F. and bubbling chlorine through it until the desired amount of chlorine, preferably about 14% by weight, is absorbed. The degree of chlorination is of importance. With low chlorination the depressant effect of the final product of this invention is low, increasing with chlorine content, but above about 14% the products become more resinous, less miscible or soluble in oil, and of lessened stability at elevated temperatures. We therefore prefer to use wax of about 120° F. melting point, chlorinated to contain about 14% of chlorine. Such a product corresponds approximately to monochlorwax and is frequently so referred to hereinafter.

The aluminum chloride used in the synthesis may be of the usual technical grade.

The organic acylating agents used in the second principal reaction or synthesis of the present invention may vary widely in nature. They may for instance correspond to the following: The monocarboxylic saturated, aliphatic acids having molecular weights as low as acetic acid and as high as montanic such for example as acetic, butyric, capric, palmitic, stearic and montanic, corresponding respectively to the acyl radicals acetyl, butyryl, capryl, palmityl, stearoyl and montanyl; unsaturated aliphatic monobasic acids such as acrylic, corresponding to the acyl radical acrylyl; saturated aliphatic polybasic acids such as succinic, oxalic, adipic, sebacic, etc.; unsaturated aliphatic polybasic acids such as fumaric; substituted mono and polybasic aliphatic acids containing halogen, hydroxyl, amino, or keto groups such as chloracetic acid, tartaric acid, and glycollic acid; aromatic monobasic acids such as benzoic and naphthoic; aromatic polybasic acids such as phthalic; alkylene-substituted aromatic monobasic acids such as cinnamic; aryl-substituted mono and polybasic aliphatic acids with COOH in side chain, such as xylic, phenylstearic, naphthylstearic and naphthylpolystearic, etc., substituted aromatic mono and polybasic acids containing halogen, hydroxyl, amino, alkyl, aryl, aralkyl, keto, nitro or alkoxy in the ring such as chlorbenzoic, salicylic, anthranilic, toluic, phenylbenzoic, nitrobenzoic, anisic and benzoylbenzoic acid; non-benzenoid cyclic mono and polycarboxylic acids such as abietic and camphoric acids and heterocyclic carboxylic acids such as furoic acid. In forming the acid chlorides of the hydroxy and/or amino substituted acids mentioned above it is desirable to first acylate these substituted groups before preparing the corresponding acyl chlorides. Of the above acylating agents those corresponding to benzoic, toluic, etc.; to the dicarboxylic aromatic acids of the class typified by phthalic acid; to acetic, and stearic acids, and to the aliphatic dibasic acids, as adipic, sebacic, and succinic acids yield the better results. In general, preference is for the dibasic acids.

These corresponding acylating agents may be conveniently used either in the form of the acid chloride, or where convenient, of the acid anhydride, both being applicable in esterification reactions, although in general the use of the acid chloride is preferred.

By this means the esterification or acylation reaction may be conveniently carried out as a continuation of the original Friedel-Crafts reaction employed for the initial condensation of the aryl compound with the chlorwax.

In connection with the second principal step of this process, the term "acylation" is used herein in a generic sense. With alkyl-aryl, and aralkyl-aryl ethers, it is believed a rearrangement, or migration of substituents occurs in the Friedel-Crafts reaction, producing phenolic compounds, which in turn are esterified upon acylation. Acylation of wax substituted aryl-aryl ethers results in the formation of ketonic products. The term acylation is used herein as defined in Hackh "Chemical Dictionary", Blackiston, Philadelphia, as "the introduction of an acyl radical into an organic compound."

In order to illustrate this invention, we shall first describe the preparation of several wax-substituted ethers, then describe their acylation with several different reagents, and then describe test data illustrating their effectiveness.

Tri-"wax" anisole may be prepared as follows: One molecular proportion of anisole (methyl phenyl ether) is melted with sufficient monochlorwax so that there are present three equivalents of chlorine. The two are heated together until a temperature of about 150° F. is reached, and anhydrous aluminum chloride is then introduced. The amount of aluminum chloride used should be about 3% by weight of the chlorwax. While adding the aluminum chloride, the mixture should be held at about 150° F., actively stirred, and the rate of addition of $AlCl_3$ should be sufficiently slow to avoid violent foaming. After the addition of $AlCl_3$ is completed, the temperature of the mixture should be raised slowly, over a period of about fifteen to twenty-five minutes, to about 250° F., and then more slowly to about 350° F. At about 200° F. a renewed evolution of hydrochloric acid gas begins and this continues as the temperature rises, becoming more violent around 275° F. To control the evolution of hydrogen chloride, the temperature preferably is raised from 250° F. to 350° F. at the rate of approximately 1° per minute. The whole operation of heating to 350° F. will occupy approximately two hours from the time of the first addition of the $AlCl_3$, and the reaction mixture should have ceased to foam, substantially, upon reaching 350° F. If it has not done so, it may be held there for a short time for completion of the reaction, but it should not be heated appreciably above 350° F., nor should it be held for any extended length of time at that temperature. Substantial deviation from the procedure outlined will result in a product of relatively much less value.

Tetra "wax" beta naphthyl methyl ether may be prepared using the same procedure, with one molecular proportion of beta naphthyl methyl ether and sufficient monochlorwax of about 14% chlorine content to give four equivalents of chlorine.

Tetra "wax" benzyl alpha naphthyl ether may be prepared using the same procedure, with one molecular proportion of benzyl alpha naphthyl ether and sufficient chlorwax of about 14% chlorine content to give four equivalents of chlorine. Benzyl alpha naphthyl ether is less reactive with chlorwax, however, requiring about 6% $AlCl_3$ by weight of chlorwax for the condensation.

Tetra "wax" benzyl ether may be prepared using the same procedure, with one molecular proportion of benzyl ether and sufficient chlorwax of about 14% chlorine content to give four equivalents of chlorine, using about 9% of $AlCl_3$ by weight of chlorwax as catalyst.

Tetra "wax" phenyl ether may be prepared using the same procedure, with one molecular proportion of phenyl ether and sufficient monochlorwax of about 14% chlorine content to give four equivalents of chlorine. Phenyl ether is more reactive with chlorwax, however, requiring about 1% of $AlCl_3$ by weight of chlorwax.

After formation of the wax-substituted product the preferred procedure is to cool the ether-wax reaction product containing the $AlCl_3$ to a temperature suitable for acylation and then to proceed directly with the latter.

In the preferred acylation procedure, employing acid chlorides, the temperature of the reaction in general should be below 350° F., and above 100° F. Under such conditions the acylation takes place almost immediately upon the addition of the acylating agent or compound containing the acyl radical. The acylation reaction is therefore conveniently governed by the rate of addition of the acylating compound, and is complete when the evolution of hydrogen chloride has ceased after the addition of the last portion of the acylating agent. Varying temperatures and reaction rates may be employed in carrying out the acylation step as may be seen from the examples given further on. In carrying out the step of acylation, especially when this is done at relatively low temperatures, which is sometimes desirable, and in the case of mixtures of relatively high viscosity, the reaction mixture may tend to foam too much, and thus reduce the speed of the acylation reaction to an objectionable degree. In such cases an appropriate diluent, such as for instance ethylenechloride may be added to the mixture to reduce its viscosity and thus prevent objectionable foaming.

After the formation of the acylated product, the process of purification of all of the novel compounds of the class with which this invention is concerned is similar and consists of an extensive washing with water to remove substantially all of the aluminum chloride, it having been found that the presence of even comparatively small amounts of residual aluminum chloride results in a lower stability of the final product. Due to the strong tendency of the acylated products to emulsify when being washed with water, this washing is sometimes difficult, but it may be conveniently accomplished by adding to the wash water a small amount of some substance capable of breaking the emulsion, as for instance, lower alcohols, such as butanol. A convenient method of purification has been found to consist of washing the reaction product about six times, each time with an equal volume of water which contains 2% of butanol.

The above noted wax-substituted aromatic ethers are then acylated with various acylating agents, such as acetyl chloride, stearoyl chloride, succinyl chloride, benzoyl chloride, phthalyl chloride, and sebacyl chloride in accordance with the described procedure to give the following compounds exemplary of this invention, certain details of preparation being noted in connection with each example.

*Example I*

Triwax anisole was condensed with acetyl chloride at 100–185° F. in the presence of ethylene chloride as diluent, completing the reaction in 30 minutes.

Reaction mixture—
Triwax anisole _____ grams__ 50
Acetyl chloride _____ do____ 8.34
Ethylene chloride _____ cc__ 25

Example II

Triwax anisole was condensed with stearoyl chloride (acid chloride prepared from stearic acid of acid number 205.6) at 150–350° F., completing the reaction in 20 minutes.

| Reaction mixture— | Grams |
|---|---|
| Triwax anisole | 50 |
| Stearoyl chloride | 15.5 |

Example III

Triwax anisole was condensed with succinyl chloride at 150–300° F., completing the reaction in 20 minutes.

| Reaction mixture— | Grams |
|---|---|
| Triwax anisole | 50 |
| Succinyl chloride | 4.12 |

Example IV

Triwax anisole was condensed with benzoyl chloride at 150–350° F., completing the reaction in 20 minutes.

| Reaction mixture— | Grams |
|---|---|
| Triwax anisole | 50 |
| Benzoyl chloride | 7.47 |

Example V

Triwax anisole was condensed with phthalyl chloride at 150–300° F., completing the reaction in 20 minutes.

| Reaction mixture— | Grams |
|---|---|
| Triwax anisole | 50 |
| Phthalyl chloride | 5.4 |

Example VI

Tetrawax beta naphthylmethyl ether, abbreviated hereafter as 4WBNM was condensed with acetyl chloride at 150–250° F., in the presence of ethylene chloride as diluent to reduce the viscosity of the mixture. The ethylene chloride was allowed to distill as the temperature was raised, completing the reaction in 30 minutes.

Reaction mixture—
| | | |
|---|---|---|
| 4WBNM | grams | 50 |
| Acetyl chloride | do | 8.34 |
| Ethylene chloride | cc | 25 |

Example VII

4WBNM was condensed with stearoyl chloride (acid chloride prepared from stearic acid of acid number 205.6) at 150–350° F., completing the reaction in 30 minutes.

| Reaction mixture— | Grams |
|---|---|
| 4WBNM | 50 |
| Stearoyl chloride | 13.6 |

Example VIII

4WBNM was condensed with sebacyl chloride at 150–350° F., completing the reaction in 20 minutes.

| Reaction mixture— | Grams |
|---|---|
| 4WBNM | 50 |
| Sebacyl chloride | 5.6 |

Example IX

4WBNM was condensed with benzoyl chloride at 150–350° F., completing the reaction in 20 minutes.

| Reaction mixture— | Grams |
|---|---|
| 4WBNM | 50 |
| Benzoyl chloride | 6.57 |

Example X

4WBNM was condensed with phthalyl chloride at 150–185° F., in the presence of ethylene chloride as diluent, completing the reaction in 30 minutes.

Reaction mixture—
| | | |
|---|---|---|
| 4WBNM | grams | 50 |
| Phthalyl chloride | do | 4.75 |
| AlCl$_3$ | do | 1.5 |
| Ethylene chloride | cc | 100 |

Example XI

Tetrawax benzyl alpha naphthyl ether was condensed with stearoyl chloride at 150–350° F., completing the reaction in 20 minutes.

| Reaction mixture— | Grams |
|---|---|
| Tetrawax benzyl alpha naphthyl ether | 50 |
| Stearoyl chloride | 13.2 |

Example XII

Tetrawax benzyl alpha naphthyl ether was condensed with benzoyl chloride at 150–350° F., completing the reaction in 20 minutes.

| Reaction mixture— | Grams |
|---|---|
| Tetrawax benzyl alpha naphthyl ether | 50 |
| Benzoyl chloride | 6.36 |

Example XIII

Tetrawax phenyl ether was condensed with succinyl chloride at 300° F., completing the reaction in 20 minutes.

| Reaction mixture— | Grams |
|---|---|
| Tetrawax phenyl ether | 50 |
| Succinyl chloride | 3.67 |

Example XIV

Tetrawax phenyl ether was condensed with benzoyl chloride at 150–350° F., completing the reaction in 20 minutes.

| Reaction mixture— | Grams |
|---|---|
| Tetrawax phenyl ether | 50 |
| Benzoyl chloride | 6.64 |

Example XV

Tetrawax phenyl ether was condensed with phthalyl chloride at 150–300° F., completing the reaction in 30 minutes.

| Reaction mixture— | Grams |
|---|---|
| Tetrawax phenyl ether | 50 |
| Phthalyl chloride | 4.8 |

Example XVI

Tetrawax benzyl ether was condensed with stearoyl chloride at 150–350° F., completing the reaction in 20 minutes.

| Reaction mixture— | Grams |
|---|---|
| Tetrawax benzyl ether | 20 |
| Stearoyl chloride | 7.94 |

The following data shows the effectiveness of the acylated compound when compared with the non-acylated compound, both used in the indicated percentages in an oil of 249″ Saybolt viscosity at 130° F., pour test (in the untreated condition) of +20° F. (The pour test indicated is the Standard A. S. T. M. Pour Test Method D97–27T, page 37, U. S. Bureau of Mines Technical Paper 323-B). The vertical columns of the tabulation (reading from left to right) show first the nature of the wax-substituted ether, second the nature of the acylating agent, and third the concentration of the depressant ingredient, expressed as per cent in oil, fourth the pour test of the oil after addition of such per cent of depressant, and the fifth and sixth vertical columns show the pour test of the oil after exposure for 3 and 4 days respectively to a heat test in which the oil is held continuously at a temperature of 342° F. in contact with air in a glass beaker while being continuously stirred with a steel propeller. A great number of tests in connection with a wide variety of lubricants have shown this heat test to be readily correlated with regular normal automotive use, a 2-day test being the equivalent of 2,000 miles of normal driving and a 3-day test being equivalent to 3,000 miles, etc.

to improve the effectiveness, or the stability, or both.

Organic acid chlorides of carboxylic acids are the preferred acylating agents. One mole of the wax-substituted aromatic ether product may be suitably acylated by the use of a molar quantity of a monobasic acid chloride or a half molar quantity of a dibasic acid chloride. Since in the case of mixed aromatic ethers the rearrangement or migration of the alkyl or aralkyl ether radicals to the aromatic nucleus is only partial, the use of the above stated amounts of the acylating agents is in excess of the amount required for the esterification of the hydroxyaromatic constituents. Accordingly, the excess of acylating agent will cause some ketone formation, with the

*Test of examplary products of the present invention*

| Starting compound | Acylating agent | Concentration % by weight | A. S. T. M. pour test Initial | After heat test at 342° F. 3 Days | 4 Days |
|---|---|---|---|---|---|
| Triwax anisole | None | ½ | −20° F. | +5° F. | +5° F. |
| " " | " | ¼ | −5° F. | | |
| " " | " | ⅛ | +10° F. | | |
| " " | Acetyl chloride | ½ | −10° F. | −10° F. | −10° F. |
| " " | " | ¼ | +5° F. | | |
| " " | Stearoyl " | ½ | −20° F. | −20° F. | −20° F. |
| " " | " | ¼ | −10° F. | | |
| " " | Succinyl " | ¼ | −20° F. | | |
| " " | " | ⅛ | −20° F. | −20° F. | |
| " " | " | ⅟₁₆ | −20° F. | −15° F. | −15° F. |
| " " | " | ⅟₃₂ | −5° F. | | |
| " " | Benzoyl " | ½ | −20° F. | −15° F. | −10° F. |
| " " | " | ¼ | 0° F. | | |
| " " | Phthalyl " | ½ | −20° F. | | |
| " " | " | ¼ | −20° F. | | |
| " " | " | ⅛ | −20° F. | −20° F. | −20° F. |
| " " | " | ⅟₁₆ | −20° F. | −5° F. | −5° F. |
| Tetrawax beta methyl ether | Naphthyl, none | ¼ | −25° F. | −15° F. | −5° F. |
| " " | " | ⅛ | −20° F. | +5° F. | |
| " " | " | ⅟₁₆ | 0° F. | | |
| " " | Acetyl chloride | ¼ | −20° F. | −20° F. | −20° F. |
| " " | " | ⅛ | −15° F. | | |
| " " | Stearoyl " | ¼ | −25° F. | −25° F. | −25° F. |
| " " | " | ⅛ | −20° F. | | |
| " " | Sebacyl " | ⅛ | −20° F. | −20° F. | |
| " " | " | ⅟₁₆ | −5° F. | | |
| Tetrawax beta naphthyl methyl ether | Benzoyl chloride | ¼ | −25° F. | −25° F. | −25° F. |
| " " | " | ⅛ | −20° F. | | |
| " " | Phthalyl " | ⅛ | −20° F. | −15° F. | |
| " " | " | ⅟₁₆ | −10° F. | | |
| Tetrawax benzyl alpha naphthyl ether | None | 1 | −20° F. | +5° F. | |
| " " | " | ½ | −20° F. | | |
| " " | " | ¼ | −10° F. | | |
| " " | Stearoyl " | 1 | −20° F. | −20° F. | |
| " " | " | ½ | −20° F. | | |
| " " | " | ¼ | −20° F. | | |
| " " | Benzoyl " | 1 | −20° F. | −20° F. | |
| " " | " | ½ | −20° F. | | |
| " " | " | ¼ | −5° F. | | |
| Tetrawax phenyl ether | None | ¼ | −20° F. | | |
| " " | " | ⅛ | −15° F. | −15° F. | |
| " " | " | ⅟₁₆ | 0° F. | | |
| " " | Succinyl " | ⅛ | −20° F. | −10° F. | |
| " " | " | ⅟₁₆ | −15° F. | | |
| " " | Benzoyl " | ¼ | −20° F. | | |
| " " | " | ⅛ | −10° F. | −10° F. | |
| " " | Phthalyl " | ⅛ | −20° F. | −10° F. | |
| " " | " | ⅟₁₆ | −10° F. | | |
| Tetrawax benzyl ether | None | ½ | −20° F. | +20° F. | +20° F. |
| " " | " | ¼ | −5° F. | +20° F. | |
| " " | Stearoyl chloride | ½ | −25° F. | +20° F. | |
| " " | " | ¼ | −25° F. | +20° F. | |

From consideraton of the above table it will be noted that the operation of acylation, when performed upon a wax-substituted alkyl-aryl ether or upon a wax-substituted aralkyl-aryl ether, or upon a wax-substituted aralkyl ether, or upon a wax-substituted aryl ether, quite generally serves to improve the effectiveness, or the stability, or both.

exception of wax-substituted aromatic ethers where the alkylation of the aromatic nucleus is complete. Any unused portion of the acylating agent will be removed in the process of purification of the product. It will be noted that wax-substituted straight aryl-aryl ethers, where the R's of the general formula are substituents such as hydrogen, alkyl, aralkyl, alkaryl or aroxy groups, and thereby free of rearrangement to phenolic constituents in the Friedel-Crafts reaction, are originally heat stable as pour depressants and that little or no improvement is gained in this respect. Similarly with these aryl-aryl ethers, modified pour depressants of increased effectiveness may be produced by acylation with dibasic acid radicals, but not generally by acylation with monobasic acid chlorides. It will also be noted that wax-substituted benzyl ether is improved only in respect to effectiveness as a pour point depressant when acylated with stearoyl chloride.

It should be noted that a convenient modification of the purification step of the process herein disclosed may be made by water-washing in the presence of a suitable inert diluent such as benzene, washing until the wash is free of aluminum chloride when made ammoniacal. Emulsions can be broken by the use of alcohols, as before. The diluent can be removed by distillation, finally heating to 200° C. under a reduced pressure of 10 millimeters.

It should be noted further that the final products of the present invention are readily oil-miscible or oil-soluble, substantially non-corrosive toward metals with which they come in contact under normal conditions of use and are also substantially water-insoluble.

We claim:

1. A mineral oil composition comprising a liquid oil and waxy hydrocarbons, and in admixture therewith a small proportion of a compound resulting from first alkylating an ether selected from the group consisting of aryl and aryl-alkyl and aralkyl-aryl ethers and their derivatives with alkyl radicals of the nature of crystalline petroleum wax and then acylating the wax-substituted ether with an acylating agent selected from the group consisting of the acid chlorides and acid anhydrides of monobasic and dibasic organic acids, the acylated compound having the power of depressing the pour point of the oily mixture.

2. A mineral oil composition comprising a liquid oil and waxy hydrocarbons, and in admixture therewith a small proportion of a compound resulting from first condensing an aromatic ether with a chlorinated petroleum wax of high melting point and subsequently acylating with a reagent selected from the group consisting of acid chlorides and anhydrides of monobasic and dibasic organic acids, the acylated compound having the power of lowering the pour point of the oily mixture.

3. A mineral oil composition comprising a liquid oil and waxy hydrocarbons and in admixture therewith a small amount of the condensation product of a carboxylic acid and a wax-substituted aromatic ether, said condensation product having the power of lowering the pour point of the oily mixture.

4. A mineral oil composition comprising a liquid oil and waxy hydrocarbons, and in admixture therewith a small amount of the condensation product of a dibasic carboxylic acid and a poly-wax-substituted aromatic ether, said condensation product having the power of lowering the pour point of the oily mixture.

5. A mineral oil composition comprising a liquid oil and waxy hydrocarbons, and in admixture therewith a small amount of a substance made by condensing an ether selected from the group consisting of compounds of the general formula

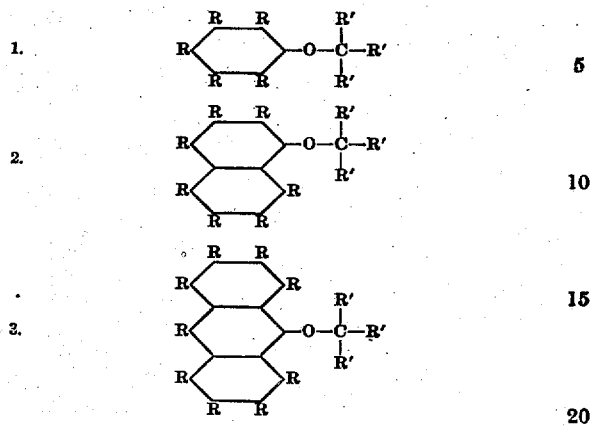

wherein R is a radical selected from the group consisting of hydrogen, alkyl, aryl, aralkyl, alkaryl, alkoxy, or aroxy, at least three R's being hydrogen, and R' a radical selected from the group consisting of hydrogen, alkyl, and aryl; and of the general formulae

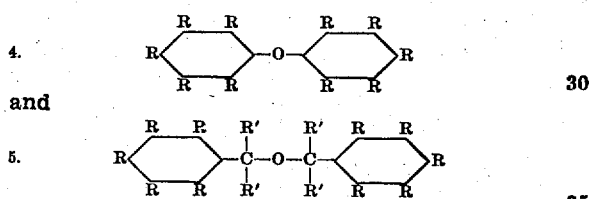

wherein the indicated aryl radical may be of benzene, naphthalene, or anthracene type, and R may be a radical selected from the group consisting of hydrogen, alkyl, aryl, aralkyl, alkaryl, alkoxy, and aroxy, at least three R's being hydrogen; with chlorinated wax in the presence of aluminum chloride as a catalyst, and subsequently acylating the condensation product with an acylating agent selected from the group consisting of organic carboxylic acids, organic carboxylic acid chlorides and organic carboxylic acid anhydrides, said acylated product having the property of lowering the pour point of the oily mixture.

6. A mineral oil composition comprising a liquid oil and waxy hydrocarbons, and in admixture therewith a small amount of a substance produced by condensing a member of the group consisting of aryl, alkyl-aryl, aralkyl-aryl, and aralkyl ethers and their derivatives with chlorinated wax in the presence of aluminum chloride, and subsequently acylating the condensation product with a substance selected from the group consisting of the acid chlorides and acid anhydrides of the following radicals: acetyl, palmitoyl, stearoyl, montanoyl, benzoyl, phthalyl, adipyl, succinyl, sebacyl, cinnamyl, said acylated substance having the power of lowering the pour point of the oily mixture.

7. A mineral oil composition comprising a liquid oil and waxy hydrocarbons, and in admixture therewith a small amount of a substance produced by condensing a member of the group consisting of aryl, alkyl-aryl, aralkyl-aryl, and aralkyl ethers and their derivatives with chlorinated wax in the presence of aluminum chloride, and subsequently acylating the condensation product with a substance selected from the group consisting of the acid chlorides and acid anhydrides of the following radicals: phthalyl, succinyl, cinnamyl, and sebacyl, said acylated substance having the power of lowering the pour point of the oily mixture.

8. A mineral oil composition comprising a liquid oil and waxy hydrocarbons and a small amount of a substance produced by condensing a member of the group consisting of anisole, naphthyl methyl ethers, benzyl naphthyl ethers, and phenyl ethers, with chlorinated wax in the presence of aluminum chloride, and subsequently acylating the condensation product with a substance selected from the group consisting of the acid chlorides and acid anhydrides of the phthalyl, succinyl, cinnamyl, and sebacyl radicals, said acylated substance having the power of lowering the pour point of the oily mixture.

ORLAND M. REIFF.
DARWIN E. BADERTSCHER.

CERTIFICATE OF CORRECTION.

Patent No. 2,114,812. April 19, 1938.

ORLAND M. REIFF, ET AL.

It is hereby certified that error appears in the printed specification of the above numbered patent requiring correction as follows: Page 1, second column, line 32; and page 2, first column, line 45, for "R,s" read R's; page 1, second column, lines 25 and 28; page 2, first column, lines 20, 23, and 43; page 6, first column, line 1; and second column, lines 23 and 40, for "R,s" read Rs; and that the said Letters Patent should be read with this correction therein that the same may conform to the record of the case in the Patent Office.

Signed and sealed this 28th day of March, A.D. 1939.

Henry Van Arsdale
Acting Commissioner of Patents.

(Seal)

cinyl, cinnamyl, and sebacyl, said acylated substance having the power of lowering the pour point of the oily mixture.

8. A mineral oil composition comprising a liquid oil and waxy hydrocarbons and a small amount of a substance produced by condensing a member of the group consisting of anisole, naphthyl methyl ethers, benzyl naphthyl ethers, and phenyl ethers, with chlorinated wax in the presence of aluminum chloride, and subsequently acylating the condensation product with a substance selected from the group consisting of the acid chlorides and acid anhydrides of the phthalyl, succinyl, cinnamyl, and sebacyl radicals, said acylated substance having the power of lowering the pour point of the oily mixture.

ORLAND M. REIFF.
DARWIN E. BADERTSCHER.

CERTIFICATE OF CORRECTION.

Patent No. 2,114,812.   April 19, 1938.

ORLAND M. REIFF, ET AL.

It is hereby certified that error appears in the printed specification of the above numbered patent requiring correction as follows: Page 1, second column, line 32; and page 2, first column, line 45, for "R,s" read R's; page 1, second column, lines 25 and 28; page 2, first column, lines 20, 23, and 43; page 6, first column, line 1; and second column, lines 23 and 40, for "R,s" read Rs; and that the said Letters Patent should be read with this correction therein that the same may conform to the record of the case in the Patent Office.

Signed and sealed this 28th day of March, A.D. 1939.

Henry Van Arsdale
Acting Commissioner of Patents.

(Seal)

CERTIFICATE OF CORRECTION.

Patent No. 2,114,812.                                             April 19, 1938.

ORLAND M. REIFF, ET AL.

It is hereby certified that error appears in the printed specification of the above numbered patent requiring correction as follows: Page 1, second column, line 32; and page 2, first column, line 45, for "R's" read R's; page 1, second column, lines 25 and 28; page 2, first column, lines 20, 23, and 43; page 6, first column, line 1; and second column, lines 23 and 40, for "R's" read Rs; and that the said Letters Patent should be read with this correction therein that the same may conform to the record of the case in the Patent Office.

Signed and sealed this 28th day of March, A.D. 1939.

Henry Van Arsdale (Seal)                                     Acting Commissioner of Patents.